US010742351B2

(12) United States Patent
Maeda et al.

(10) Patent No.: US 10,742,351 B2
(45) Date of Patent: Aug. 11, 2020

(54) COMMUNICATION CONTROL DEVICE, TOLL COLLECTION SYSTEM, COMMUNICATION CONTROL METHOD, AND COMMUNICATION CONTROL PROGRAM

(71) Applicant: MITSUBISHI HEAVY INDUSTRIES MACHINERY SYSTEMS, LTD., Kobe-shi, Hyogo (JP)

(72) Inventors: Takashi Maeda, Tokyo (JP); Satoshi Nozaki, Kobe (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 16/336,330

(22) PCT Filed: Nov. 21, 2016

(86) PCT No.: PCT/JP2016/084443
§ 371 (c)(1),
(2) Date: Mar. 25, 2019

(87) PCT Pub. No.: WO2018/092307
PCT Pub. Date: May 24, 2018

(65) Prior Publication Data
US 2019/0222350 A1 Jul. 18, 2019

(51) Int. Cl.
*H04B 7/00* (2006.01)
*H04L 1/00* (2006.01)
(Continued)

(52) U.S. Cl.
CPC ............ *H04L 1/0036* (2013.01); *G07B 15/00* (2013.01); *G07B 15/063* (2013.01); *G08G 1/09* (2013.01);
(Continued)

(58) Field of Classification Search
USPC ........................................................ 455/41.2
See application file for complete search history.

(56) References Cited

U.S. PATENT DOCUMENTS 3,614,729 A * 10/1971 Fujimoto ................ G01S 13/92
340/933
6,657,554 B1 * 12/2003 Terashima ............ G07B 15/063
340/928
(Continued)

FOREIGN PATENT DOCUMENTS

JP H08-194851 A 7/1996
JP 2001-068925 A 3/2001
(Continued)

OTHER PUBLICATIONS

PCT/ISA/210, "International Search Report for International Application No. PCT/JP2016/084443," dated Feb. 28, 2017.
(Continued)

*Primary Examiner* — Kathy W Wang-Hurst
*Assistant Examiner* — Max Mathew
(74) *Attorney, Agent, or Firm* — Manabu Kanesaka; Benjamin Hauptman; Kenneth Berner

(57) ABSTRACT

A communication control device is provided with: an erroneous communication prevention antenna capable of receiving electromagnetic waves transmitted from an electromagnetic wave leakage monitoring region, which is defined in a region different from a dedicated short-range communication region where valid communication with a dedicated short-range communication antenna is carried out; a signal alteration unit which is provided on a communication interconnection between the dedicated short-range communication antenna and an antenna controller, and which alters a signal received from the dedicated short-range communication antenna; and a signal alteration unit control unit which, when the erroneous communication prevention antenna has
(Continued)

received electromagnetic waves, causes the signal transmitted from the dedicated short-range communication antenna to the antenna controller to be altered.

7 Claims, 8 Drawing Sheets

(51) Int. Cl.
| | |
|---|---|
| *G07B 15/06* | (2011.01) |
| *G07B 15/00* | (2011.01) |
| *G08G 1/09* | (2006.01) |
| *H04B 1/10* | (2006.01) |
| *H04W 4/20* | (2018.01) |
| *H04W 4/80* | (2018.01) |
| *H04W 4/44* | (2018.01) |

(52) U.S. Cl.
CPC ............... *H04B 1/10* (2013.01); *H04W 4/20* (2013.01); *H04W 4/44* (2018.02); *H04W 4/80* (2018.02)

(56) References Cited

U.S. PATENT DOCUMENTS

| | | | |
|---|---|---|---|
| 7,178,728 B2* | 2/2007 | Kojima | G07B 15/063 235/384 |
| 2004/0004120 A1* | 1/2004 | Kojima | G08G 1/01 235/384 |
| 2009/0307151 A1* | 12/2009 | Schlierkamp-Voosen | G07B 15/063 15/63 |
| 2014/0288728 A1* | 9/2014 | Tsuchida | G06F 11/0739 701/1 |
| 2019/0230522 A1* | 7/2019 | Sugaya | H04W 72/0473 |

FOREIGN PATENT DOCUMENTS

| | | |
|---|---|---|
| JP | 2007-241542 A | 9/2007 |
| JP | 2013-098772 A | 5/2013 |

OTHER PUBLICATIONS

PCT/ISA/237, "Written Opinion of the International Searching Authority for International Application No. PCT/JP2016/0844-43," dated Feb. 28, 2017.

* cited by examiner

COMMUNICATION CONTROL DEVICE, TOLL COLLECTION SYSTEM, COMMUNICATION CONTROL METHOD, AND COMMUNICATION CONTROL PROGRAM

RELATED APPLICATIONS

The present application is National Phase of International Application No. PCT/JP2016/084443 filed Nov. 21, 2016, the disclosure of which is hereby incorporated by reference herein in its entirety.

TECHNICAL FIELD

The disclosure relates to a communication control device, a toll collection system, a communication control method, and a communication control program.

BACKGROUND ART

In intelligent transport systems (ITSs), an electronic toll collection system (ETC (trade name), also referred to as an "automatic toll collection system") is widely applied as a system configured to automatically collect the tolls in toll roads. The electronic toll collection system allows the tolls of toll roads to be collected by means of dedicated short-range radio communications between onboard units installed in vehicles and roadside antennas (dedicated short-range communication antennas) installed in tollgates.

In a case where a particular roadside antenna communicates with a particular onboard unit, the particular roadside antenna may have irrelevant communications with a non-target vehicle that is outside the dedicated short-range communication region defined for the valid dedicated short-range radio communications (hereinafter, such irrelevant communication(s) are referred to as "erroneous communication(s)"). For example, the reflection of the electromagnetic waves by the structure such as the ceiling of the tollgate may cause erroneous communications to be established between the roadside antenna with the onboard unit on a different vehicle that follows the vehicle in the dedicated short-range communication region (the target vehicle for the valid communications).

A technique to address such as problem is use of an electromagnetic wave absorbing panel installed in the structure on the road (see, for example, Patent Document 1).

CITATION LIST

Patent Document

Patent Document 1: JP 2001-068925 A

SUMMARY OF INVENTION

Problem to be Solved by the Invention

However, providing every tollgate structure with an electromagnetic wave absorbing panel requires an enormous cost. This case requires an additional cost for maintenance to prevent the electromagnetic wave absorbing panel from falling.

To address the problems mentioned above, the disclosure provides a communication control device, a toll collection system, a communication control method, and a communication control program, all of which contribute to a simple system capable of reducing erroneous communications.

Solution to Problem

A communication control device (1a) according to an aspect of the disclosure includes: an erroneous communication prevention antenna (21) operable to receive electromagnetic waves sent from an electromagnetic wave leakage monitoring region (Q2) defined in a region that is different from a dedicated short-range communication region (Q1) where valid communications are performed with a dedicated short-range communication antenna (20); a signal alteration unit (320) disposed on a communication interconnection between the dedicated short-range communication antenna and a main control device (31) and operable to alter a received signal that is received from the dedicated short-range communication antenna; and a signal alteration unit control unit (322) operable to control the signal alteration unit in a case where the erroneous communication prevention antenna receives electromagnetic waves to make the signal alteration unit alter the received signal transmitted from the dedicated short-range communication antenna to the main control device.

With this configuration, in a case where the onboard unit with which the main control device should have no valid communications sends electromagnetic waves, the electromagnetic waves are received by the erroneous communication prevention antenna. In addition, in a case where the erroneous communication prevention antenna receives electromagnetic waves, the signal alteration unit control unit controls the signal alteration unit and thus makes the signal alteration unit alter the received signal received from the dedicated short-range communication antenna before the received signal reaches the antenna controller 31.

Hence, only with the above-described simple configuration, the erroneous communications with the onboard unit that does not exist in the dedicated short-range communication region can be suppressed.

In addition, according to an aspect of the disclosure, the signal alteration unit may be a switch (320) operable to select connection/cut off of the communication interconnection.

With this configuration, in a case where the erroneous communication prevention antenna receives electromagnetic waves, the signal alteration unit control unit can control the signal alteration unit serving as a switch, and thus can make the signal alteration unit cut off (alter) at least a part of the transmission, to the antenna controller 31, of the received signal that is received from the dedicated short-range communication antenna.

In addition, according to an aspect of the disclosure, the above-described communication control device may further include a monitoring-time setting unit (323) configured to set a monitoring time in accordance with a signal-sending timing at which the main control device sends a signal, wherein in a case where the erroneous communication prevention antenna receives electromagnetic waves during the monitoring time, the signal alteration unit control unit may alter the received signal.

With this configuration, the alteration process by the signal alteration unit control unit is limited to within a period when response signal to the sent signal is assumed to be received (i.e., within the monitoring time). Hence, the malfunction of the communication control device caused by the reception of disturbing electromagnetic waves or the like by the erroneous communication prevention antenna can be suppressed.

In addition, according to an aspect of the disclosure, in a case where the erroneous communication prevention antenna receives electromagnetic waves having the same frequency as the frequency of the electromagnetic waves sent by the dedicated short-range communication antenna, the signal alteration unit control unit may alter the received signal.

With this configuration, in a case where short-range communications for different lanes are performed at different frequencies from one another, erroneous communications with a vehicle traveling on a different lane can be suppressed.

In addition, according to an aspect of the disclosure, the dedicated short-range communication antenna may be capable of receiving electromagnetic waves sent from the dedicated short-range communication region defined on a lane on top of an elevated road, and the erroneous communication prevention antenna may be capable of receiving electromagnetic waves sent from the electromagnetic wave leakage monitoring region defined on a lane under the elevated road.

With this configuration, erroneous communications with a vehicle traveling on the lane under the elevated road can be suppressed.

In addition, an aspect of the disclosure provides a toll collection system including: the above-described communication control device; the dedicated short-range communication antenna; and an antenna controller provided as the main control device and operable to perform toll-collection communications via the dedicated short-range communication antenna.

In addition, an aspect of the disclosure provides a communication control method using: an erroneous communication prevention antenna operable to receive electromagnetic waves sent from an electromagnetic wave leakage monitoring region defined in a region that is different from a dedicated short-range communication region where valid communications are performed with a dedicated short-range communication antenna; and a signal alteration unit disposed on a communication interconnection between the dedicated short-range communication antenna and a main control device and operable to alter a received signal that is received from the dedicated short-range communication antenna. In addition, the method includes the step of controlling the signal alteration unit in a case where the erroneous communication prevention antenna receives electromagnetic waves, making the signal alteration unit alter the received signal transmitted from the dedicated short-range communication antenna to the main control device.

In addition, an aspect of the disclosure provides a program applied to a computer of a communication control device including: an erroneous communication prevention antenna operable to receive electromagnetic waves sent from an electromagnetic wave leakage monitoring region defined in a region that is different from a dedicated short-range communication region where valid communications are performed with a dedicated short-range communication antenna; and a signal alteration unit disposed on a communication interconnection between the dedicated short-range communication antenna and a main control device and operable to alter a received signal that is received from the dedicated short-range communication antenna. In addition, the program includes making the computer function as a signal alteration unit control unit operable to control the signal alteration unit in a case where the erroneous communication prevention antenna receives electromagnetic waves to make the signal alteration unit alter the received signal transmitted from the dedicated short-range communication antenna to the main control device.

Advantageous Effect of Invention

According to the communication control device, the toll collection system, the communication control method, and the communication control program, erroneous communications can be suppressed by use of a simple configuration.

DESCRIPTION OF EMBODIMENTS

First Embodiment

Figure 1:
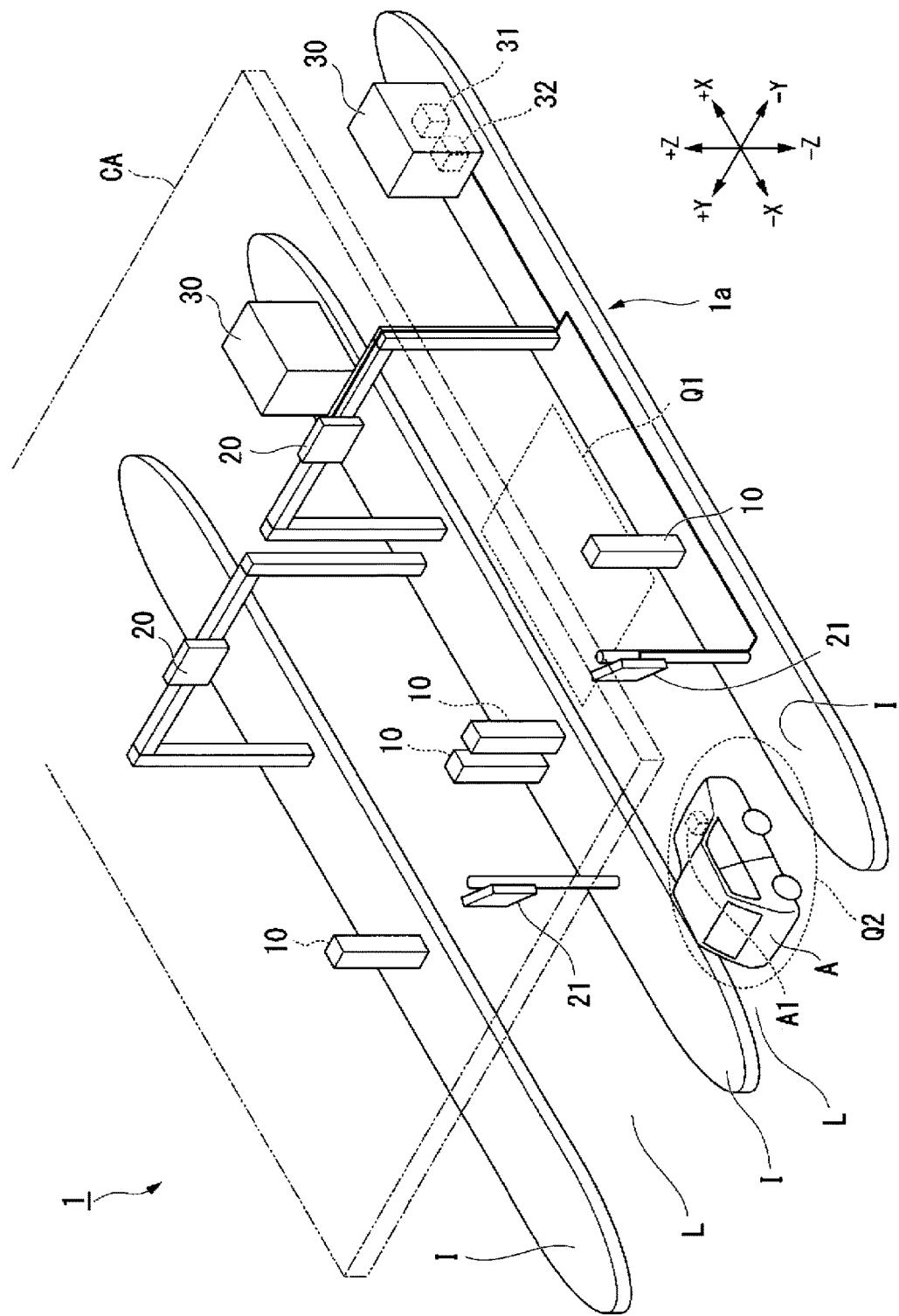
FIG. 1 is a diagram illustrating an overall configuration of a toll collection system according to a first embodiment.

A toll collection system and a communication control device according to a first embodiment will be described below with reference to FIG. 1 to FIG. 6.
Overall Configuration of Toll Collection System FIG. 1 is a diagram illustrating an overall configuration of a toll collection system according to the first embodiment.

A toll collection system 1 according to the first embodiment is a toll collection system operable to perform dedicated short-range radio communications for collecting the toll (hereinafter, also referred simply to as "short-range communications") with a vehicle traveling on a particular lane and to also perform an electronic billing and payment (toll collection processing) without forcing the vehicle to stop.

Such a toll collection system 1 is provided in, for example, entry tollgates, exit tollgates, etc. in toll roads such as expressways. As illustrated in FIG. 1, the toll collection system 1 includes a plurality of lanes L constructed side by side one another. A vehicle A that tries to pass through the entry tollgate (or the exit tollgate) needs to travel on any one of the plurality of lanes L.

A roof CA is disposed over the entry tollgate (exit tollgate) where the toll collection system 1 is installed.

As illustrated in FIG. 1, the toll collection system 1 includes a vehicle detector 10, an dedicated short-range communication antenna 20, an erroneous communication prevention antenna 21, and a lane control device 30. The lane control device 30 includes an antenna controller 31 and an IF box (interface box) 32 installed therein.

In this embodiment, a communication control device 1*a* includes an erroneous communication prevention antenna 21 and the IF box 32.

The vehicle detector 10 is disposed on the island I at a position on the upstream side (on the −X direction side) of the lane L, and is operable to detect whether a vehicle has entered the lane L.

The dedicated short-range communication antenna 20 is an antenna operable to perform short-range communications between the lane control device 30 (antenna controller 31) (to be described later) and an onboard unit A1 installed in the vehicle A.

The dedicated short-range communication antennas 20 are secured individually to support members (gantries, poles, etc.), and are disposed individually for the plurality of lanes L. Each of the dedicated short-range communication antennas 20 performs short-range communications with the vehicle A traveling on the corresponding lane L. Specifically, the dedicated short-range communication antenna 20 is capable of transmitting and receiving electromagnetic waves with a pre-designed directivity that allows the dedicated short-range communication antenna 20 to perform short-range communications with the vehicle A existing in a dedicated short-range communication region Q1 on the corresponding lane L.

The erroneous communication prevention antenna 21 is disposed in the IF box 32 (to be described later) and is operable to control the communications between the dedicated short-range communication antenna 20 and the antenna controller 31. In this embodiment, the erroneous communication prevention antenna 21 is a receive-only antenna. The erroneous communication prevention antenna 21 has a pre-designed directivity that allows the erroneous communication prevention antenna 21 to receive electromagnetic waves from the vehicle A (onboard unit A1) existing in an electromagnetic wave leakage monitoring region Q2 on the corresponding lane L.

Note that the electromagnetic wave leakage monitoring region Q2 is defined to be a region that is different from the dedicated short-range communication region Q1.

The lane control devices 30 are individually provided for the lanes L, and each of the lane control devices is installed on the corresponding island I for the corresponding lane L. The lane control device 30 controls the overall toll collection processing in the toll collection system 1. Specifically, the antenna controller 31 of the lane control device 30 performs short-range communications for the vehicle A via the dedicated short-range communication antenna 20 with the onboard unit A1 installed in the vehicle A traveling on the lane L.

In a case where the lane control device 30 detects, via the vehicle detector 10, entry of a particular vehicle A into the lane L, the lane control device 30 makes the dedicated short-range communication antenna 20 send electromagnetic waves to start short-range communications with the particular vehicle A.

Figure 2:
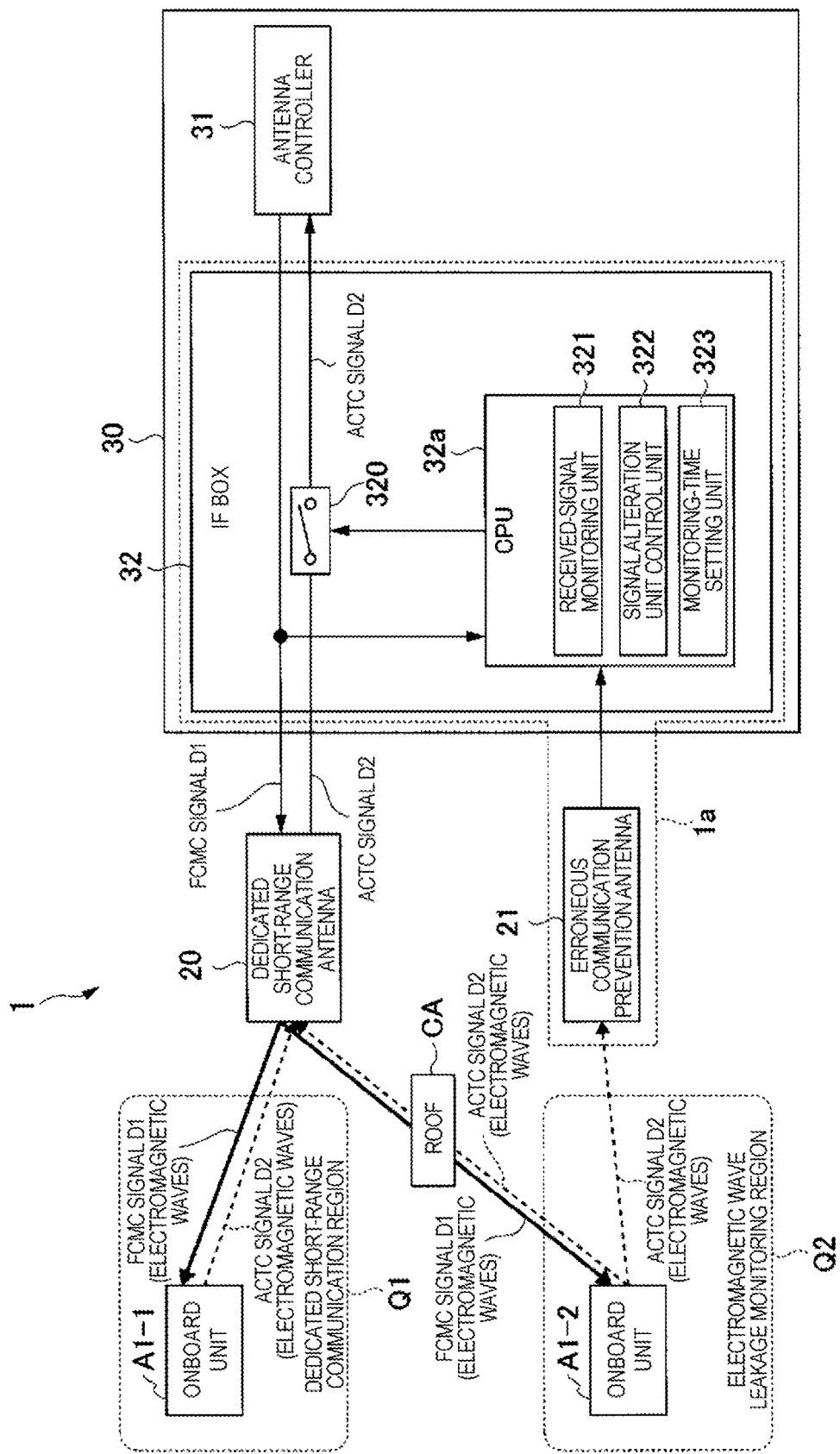
FIG. 2 is a block diagram illustrating a functional configuration of the toll collection system according to the first embodiment.

FIG. 2 is a block diagram illustrating a functional configuration of the toll collection system according to the first embodiment.

As illustrated in FIG. 2, the lane control device 30 includes the antenna controller 31 and the IF box 32.

The antenna controller 31 is a main control device included in the lane control device 30, and performs communications for collecting the toll with the onboard unit A1 via the dedicated short-range communication antenna 20.

The antenna controller 31 outputs a frame control message channel signal (FCMC signal) D1 towards the dedicated short-range communication antenna 20 at the timing when the antenna controller 31 receives a vehicle detection signal from the vehicle detector 10 (not illustrated in FIG. 2). As will be described later, once the onboard unit A1 (see FIG. 1) receives a FCMC signal D1 sent from the antenna controller 31, the onboard unit A1 sends an activation channel signal (ACTC signal D2), which is a response signal allowing the onboard unit A1 to start short-range communications with the antenna controller 31. The ACTC signal D2 contains the identification number (i.e., onboard unit number) assigned uniquely to the onboard unit A1.

The FCMC signal D1 and the ACTC signal D2 are signals defined by Association of Radio Industries and Businesses (ARIB) standards, which are standard telecommunication specifications of dedicated short-range communication (DSRC) system.

As illustrated in FIG. 2, the FCMC signal D1 (electromagnetic waves) sent from the dedicated short-range communication antenna 20 is normally received by an onboard unit A1-1 that exists in the dedicated short-range communication region Q1. Once the onboard unit A1-1 receives the FCMC signal D1 sent from the dedicated short-range communication antenna 20, the onboard unit A1-1 sends ACTC signal D2 (electromagnetic waves) in response to the reception. The ACTC signal D2 sent by the onboard unit A1-1 is received by the dedicated short-range communication antenna 20. The ACTC signal D2 received by the dedicated short-range communication antenna 20 is transmitted though the communication interconnection that connects the dedicated short-range communication antenna 20 to the antenna controller 31, and is then received by the antenna controller 31.

As illustrated in FIG. 2, the FCMC signal D1 sent from the dedicated short-range communication antenna 20 may reach outside the dedicated short-range communication region Q1 (i.e., may reach the electromagnetic wave leakage monitoring region Q2) due to the reflection by the roof CA, etc. Hence, the FCMC signal D1 may be received by another onboard unit A1-2, which exists in the electromagnetic wave leakage monitoring region Q2.

In this case, once the onboard unit A1-2 receives an FCMC signal D1 (electromagnetic waves) sent from the dedicated short-range communication antenna 20, the onboard unit A1-2 sends an ACTC signal D2 (electromagnetic waves) as in the case of the onboard unit A1-1. The ACTC signal D2 sent by the onboard unit A1-2 is received by the dedicated short-range communication antenna 20.

In addition, as the onboard unit A1-2 exists in the electromagnetic wave leakage monitoring region Q2, the ACTC signal D2 sent by the onboard unit A1-2 is also received by the erroneous communication prevention antenna 21.

Next, a functional configuration of the IF box 32 will be described below.

As illustrated in FIG. 2, the IF box 32 includes a CPU 32*a* and a switch 320.

The CPU 32*a* is a processor configured to control the overall operations of the IF box 32. The CPU 32*a* itself operates in accordance with loaded predetermined loaded programs to function various ways. Functions of the CPU 32*a* will be described later.

The switch 320 is disposed on the communication interconnection that connects the dedicated short-range communication antenna 20 with the antenna controller 31. The switch 320 functions as a signal alteration unit configured to alter the signal received from the dedicated short-range communication antenna 20. To be more specific, the switch 320 is a switch operable to switch the connection/cut off of the communication interconnection between the dedicated short-range communication antenna 20 and the antenna controller 31.

The switch 320 may be a hardware switch or a software switch.

The CPU 32a functions as a received-signal monitoring unit 321, a signal alteration unit control unit 322, and a monitoring-time setting unit 323.

The received-signal monitoring unit 321 is operable to monitor the signal received from the erroneous communication prevention antenna 21 and to determine whether the erroneous communication prevention antenna 21 has received electromagnetic waves.

In a case where the erroneous communication prevention antenna 21 has received electromagnetic waves, the signal alteration unit control unit 322 controls the switch 320 to make the switch 320 alter the received signal (specifically, the signal received by the dedicated short-range communication antenna 20) transmitted from the dedicated short-range communication antenna 20 to the antenna controller 31. Specifically, the signal alteration unit control unit 322 performs a control of opening the switch 320 to cut the communication interconnection, so that the received signal transmitted from the dedicated short-range communication antenna 20 to the antenna controller 31 loses at least a part thereof.

The monitoring-time setting unit 323 sets a monitoring time in accordance with the signal-sending timing at which the antenna controller 31 sends a signal (FCMC signal D1).

Figure 3:
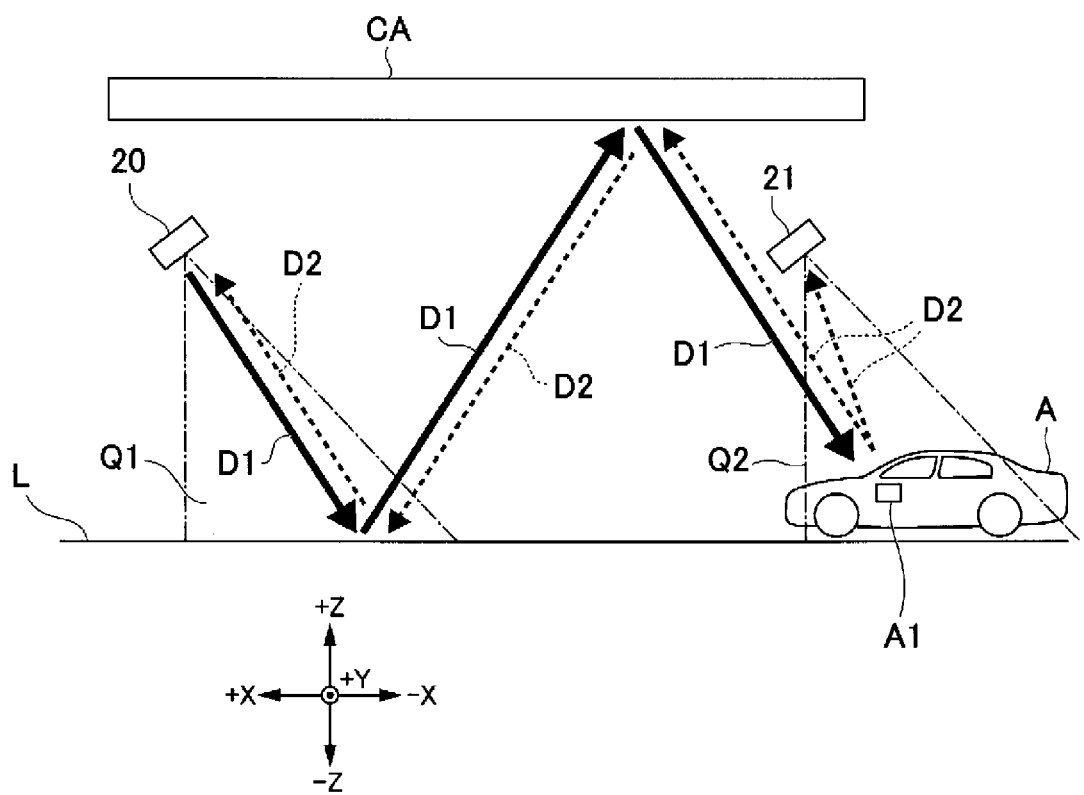
FIG. 3 is a first diagram describing actions of a communication control device according to the first embodiment.

FIG. 3 is a first diagram describing actions of a communication control device according to the first embodiment.

FIG. 3 is a schematic view of the lane L seen from a side, and illustrates an exemplar case of erroneous communications. As illustrated in FIG. 3, the FCMC signal D1 sent from the dedicated short-range communication antenna 20 may be reflected by the road surface of the lane L and by the roof CA, and then received by the onboard unit A1 of the vehicle A that does not exist in the dedicated short-range communication region Q1 (that exists in the electromagnetic wave leakage monitoring region Q2). In this case, the onboard unit A1 sends an ACTC signal D2 in response to the received FCMC signal D1. As in the case of the FCMC signal D1, the ACTC signal D2 sent from the onboard unit A1 is reflected by the roof CA and the road surface of the lane L, and is then received by the dedicated short-range communication antenna 20. The dedicated short-range communication antenna 20 is not able to distinguish between the received ACTC signal D2 sent from within the dedicated short-range communication region Q1 and the received ACTC signal D2 sent from outside of the dedicated short-range communication region Q1. Hence, erroneous communications may take place with the vehicle A that exists outside the dedicated short-range communication region Q1 unless a measure is taken.

In this embodiment, the erroneous communication prevention antenna 21 is disposed so that the erroneous communication prevention antenna 21 is capable of receiving the electromagnetic waves sent from the electromagnetic wave leakage monitoring region Q2. Hence, as illustrated in FIG. 3, the erroneous communication prevention antenna 21 receives the ACTC signal D2 sent from the onboard unit A1 that exists in the electromagnetic wave leakage monitoring region Q2.

Figure 4:
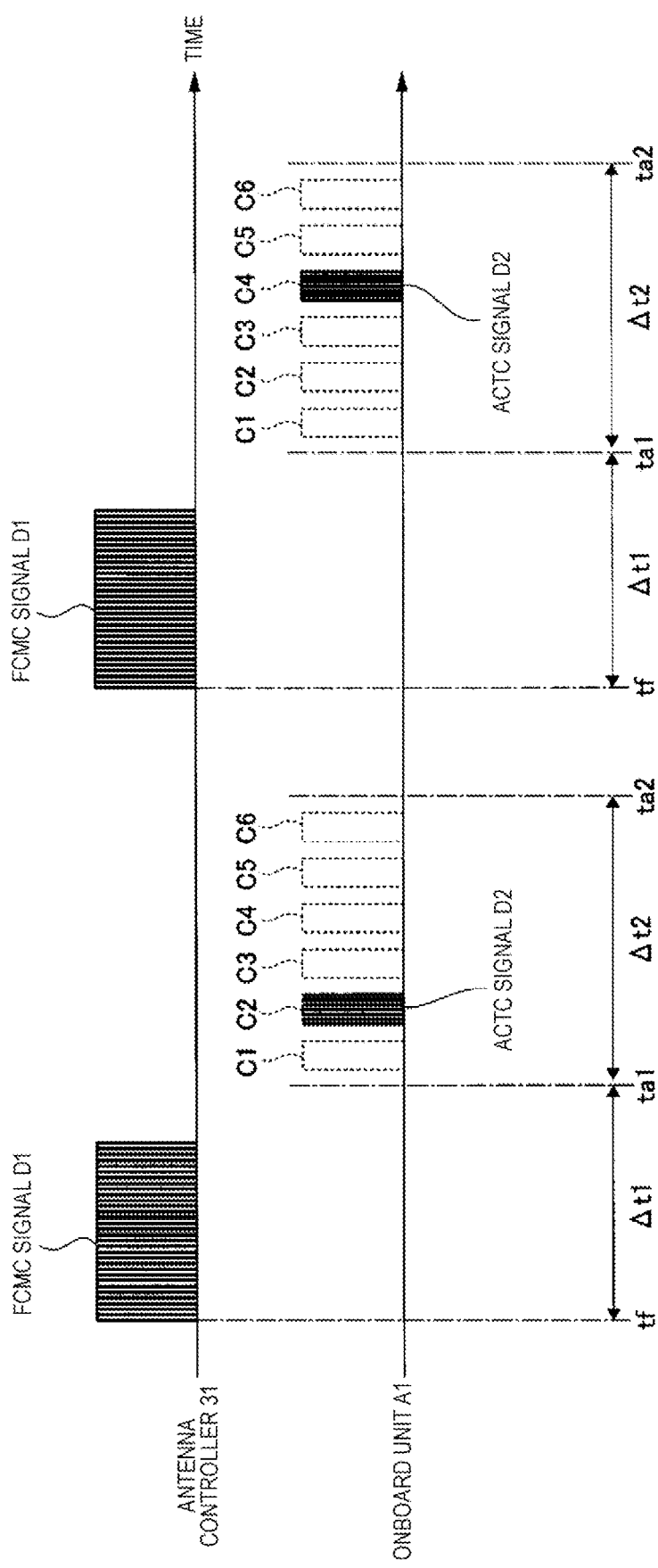
FIG. 4 is a diagram describing actions of an antenna controller and an onboard unit according to the first embodiment.

FIG. 4 is a diagram describing actions of an antenna controller and an onboard unit according to the first embodiment.

FIG. 4 is a timing chart of the FCMC signal D1 sent by the antenna controller 31 towards the onboard unit A1 and the ACTC signal D2 sent by the onboard unit A1 towards the antenna controller 31.

Now, the short-range communications between the antenna controller 31 and the onboard unit A1 will be briefly described with reference to FIG. 4.

As illustrated in FIG. 4, by sending, repeatedly at constant intervals, the FCMC signal D1 towards the dedicated short-range communication region Q1 (see FIG. 1 and FIG. 2), the antenna controller 31 requests the onboard unit A1 that exists in the dedicated short-range communication region Q1 to send (respond with) an ACTC signal D2.

According to the above-mentioned ARIB standards, once the onboard unit A1 receives the FCMC signal D1, the onboard unit A1 sends the ACTC signal D2 over electromagnetic waves at a timing corresponding to any one of the six channels (i.e., channels C1 to C6 illustrated in FIG. 4) defined beforehand individually for different periods.

The timing (i.e., one of the channels C1 to C6) at which the onboard unit A1 sends the ACTC signal D2 is selected randomly every time the onboard unit A1 sends the ACTC signal D2. There may be a case where a plurality of vehicles A (onboard units A1) that exist in a single dedicated short-range communication region Q1 simultaneously receive the FCMC signal D1. Even in this case, however, crosstalk that might otherwise be caused by the overlapping of the sending of the ACTC signal D2 from the plurality of onboard units A1 can be suppressed.

The timings (i.e., the channels C1 to C6) at which the onboard unit A1 outputs (sends) the ACTC signal D2 are defined by using, as a reference, a point of time tf when the antenna controller 31 outputs the FCMC signal D1. Specifically, the sending of the ACTC signal D2 by the onboard unit A1 is performed between a point of time ta1 that is a predetermined length of time Δt1 after the point of time tf and a point of time ta2 that is a predetermined length of time Δt2 after the point of time ta1.

Figure 5:
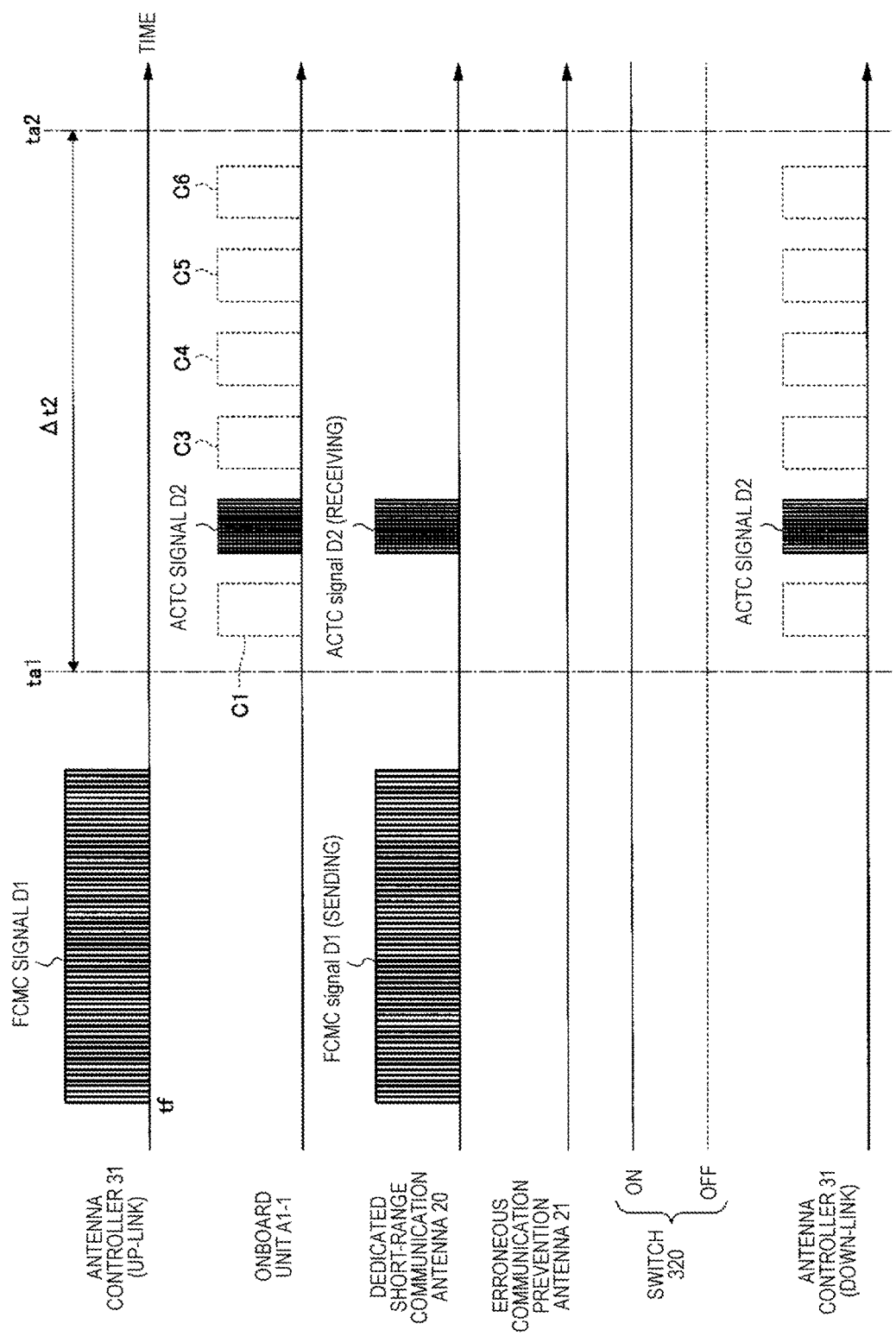
FIG. 5 is a second diagram describing actions of the communication control device according to the first embodiment.
Figure 6:
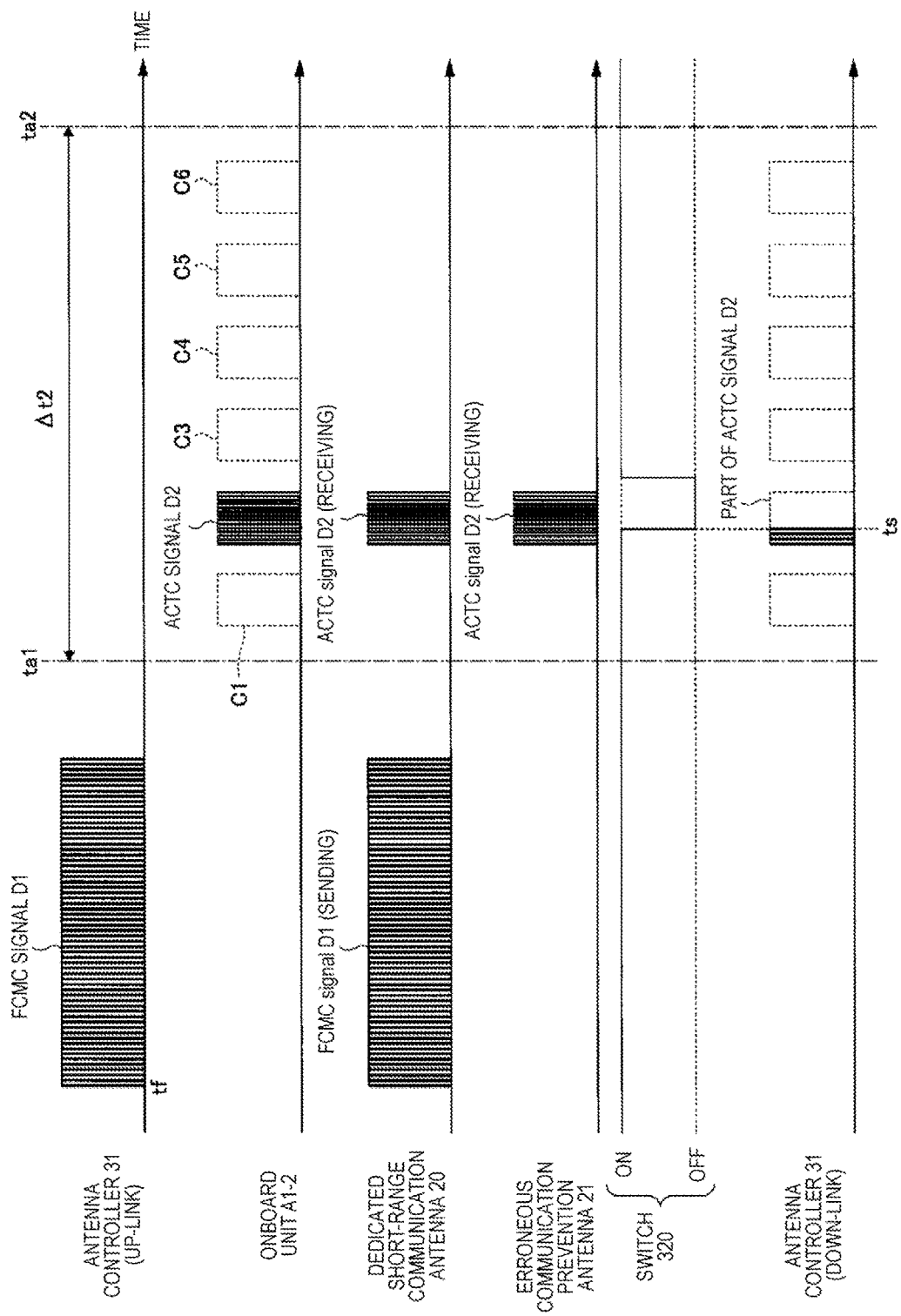
FIG. 6 is a third diagram describing actions of the communication control device according to the first embodiment.

FIG. 5 and FIG. 6 are a second drawing and a third drawing, respectively, describing actions of the communication control device according to the first embodiment.

FIG. 5 and FIG. 6 are timing charts illustrating the Up-Link side (sending side) signal of the antenna controller 31, Down-Link side (receiving side) signal of the antenna controller 31, signals sent by the onboard unit A1, the signal received by the erroneous communication prevention antenna 21, and the ON/OFF state of the switch 320.

Specifically, FIG. 5 is a timing chart of a case where the dedicated short-range communication antenna 20 receives a signal (ACTC signal D2) sent from the vehicle A (specifically, the onboard unit A1-1 (see FIG. 2)) that exists in the dedicated short-range communication region Q1. In addition, FIG. 6 is a timing chart of a case where the dedicated short-range communication antenna 20 has received a signal sent from the vehicle A (specifically, the onboard unit A1-2 (see FIG. 2)) that exists in the electromagnetic wave leakage monitoring region Q2.

Now, the flow of the processes included in the valid short-range communications between the antenna controller 31 and the onboard unit A1-1 will be described below with reference to FIG. 2 and FIG. 5.

Firstly, the antenna controller 31 outputs the FCMC signal D1 at the point of time tf (see the line of the antenna controller 31 (Up-Link) in FIG. 5).

Then, the monitoring-time setting unit 323 (CPU 32a) of the IF box 32 sets a monitoring time by using the output of the FCMC signal D1 by the antenna controller 31 as a trigger. Specifically, the monitoring-time setting unit 323 sets, as the "monitoring time," the duration of time during which the response signal (ACTC signal D2) to the FCMC signal D1 outputted at the point of time tf is expected to be received (i.e., the duration of time from the point of time ta1 to the point of time ta2).

As illustrated in FIG. 5, the FCMC signal D1 outputted from the antenna controller 31 is sent, as electromagnetic waves, via the dedicated short-range communication antenna 20.

The onboard unit A1-1 that exists in the dedicated short-range communication region Q1 receives the FCMC signal D1 sent from the dedicated short-range communication antenna 20. Then, the onboard unit A1-1 sends the ACTC signal D2 in response to the reception of the FCMC signal D1. In the examples illustrated in FIG. 5, the onboard unit A1-1 sends the ACTC signal D2 in the period of the channel C2. As illustrated in FIG. 5, the ACTC signal D2 sent by the onboard unit A1-1 is received by the dedicated short-range communication antenna 20. However, as the onboard unit A1-1, exists in the dedicated short-range communication region Q1 (not in the electromagnetic wave leakage monitoring region Q2), the ACTC signal D2 sent by the onboard unit A1-1 is not received by the erroneous communication prevention antenna 21.

During the monitoring time set by the monitoring-time setting unit 323, the received-signal monitoring unit 321 (CPU 32a) in the IF box 32 determines whether the erroneous communication prevention antenna 21 has received electromagnetic waves. In the example illustrated in FIG. 5, the erroneous communication prevention antenna 21 has received no electromagnetic waves during the monitoring time. Hence, the received-signal monitoring unit 321 detects no reception of electromagnetic waves by the erroneous communication prevention antenna 21 during the monitoring time.

Then, during the monitoring time, the signal alteration unit control unit 322 (CPU 32a) in the IF box 32 constantly makes the switch 320 perform a closing action. Specifically, during the monitoring time, the communication interconnection between the antenna controller 31 and the dedicated short-range communication antenna 20 is constantly kept in the connected state. Hence, as illustrated in FIG. 5, the ACTC signal D2 received by the dedicated short-range communication antenna 20 goes on to be received by the antenna controller 31 (see the antenna controller 31 (Down-Link) in FIG. 5).

In accordance with the above-described flow of the processes, the antenna controller 31 can perform valid short-range communications with the vehicle A (i.e., the onboard unit A1-1) that exists in the dedicated short-range communication region Q1.

Next, the flow of the processes included in the short-range communications between the antenna controller 31 and the onboard unit A1-2 will be described below with reference to FIG. 2 and FIG. 6.

As in the case of FIG. 5, the antenna controller 31 outputs the FCMC signal D1 at the point of time tf (see the line of the antenna controller 31 (Up-Link) in FIG. 6).

Then, the monitoring-time setting unit 323 sets a monitoring time by using the output of the FCMC signal D1 by the antenna controller 31 as a trigger. Specifically, the monitoring-time setting unit 323 sets, as the "monitoring time," the duration of time during which the ACTC signal D2 responding to the FCMC signal D1 outputted at the point of time tf is expected to be received (i.e., the duration of time from the point of time ta1 to the point of time ta2).

As illustrated in FIG. 6, the FCMC signal D1 outputted from the antenna controller 31 is sent, as electromagnetic waves, via the dedicated short-range communication antenna 20.

In a state that is assumed to be normal, the onboard unit A1-2 that exists in the electromagnetic wave leakage monitoring region Q2 receives no FCMC signal D1 sent from the dedicated short-range communication antenna 20. In reality, however, as illustrated with reference to FIG. 3, there is reflection by the road surface of the lane L and by the roof CA, which may allow the onboard unit A1-2 that does not exist in the dedicated short-range communication region Q1 to receive the FCMC signal D1. In this case, the onboard unit A1-2 sends an ACTC signal D2 in response to the reception of the FCMC signal D1. In the examples illustrated in FIG. 6, the onboard unit A1-2 sends the ACTC signal D2 in the period of the channel C2. As illustrated in FIG. 6, the ACTC signal D2 sent by the onboard unit A1-2 is reflected by the roof CA and the road surface of the lane L, and is then received by the dedicated short-range communication antenna 20 as in the case of the FCMC signal D1 sent from the dedicated short-range communication antenna 20. In addition, as the onboard unit A1-2 exists in the electromagnetic wave leakage monitoring region Q2, the ACTC signal D2 sent by the onboard unit A1-2 is also received by the erroneous communication prevention antenna 21.

In the example illustrated in FIG. 6, the erroneous communication prevention antenna 21 has received electromagnetic waves during the monitoring time. Hence, the received-signal monitoring unit 321 determines that the erroneous communication prevention antenna 21 has received electromagnetic waves.

Then, the signal alteration unit control unit 322 (CPU 32a) in the IF box 32 makes the switch 320 perform an opening action (shifting from ON to OFF) at the timing when the received-signal monitoring unit 321 detects the received signal (i.e., at the point of time ts). Specifically, at the timing when the erroneous communication prevention antenna 21 detects the received signal (at the point of time ts), the connection of the communication interconnection between the antenna controller 31 and the dedicated short-range communication antenna 20 is cut. Hence, as illustrated in FIG. 6, a part of the ACTC signal D2 received by the dedicated short-range communication antenna 20, specifically, the part corresponding to the period after the point of time ts, cannot reach the antenna controller 31 (see the antenna controller 31 (Down-Link) in FIG. 6). The antenna controller 31 does not maintain the valid short-range communications in response to the ACTC signal D2 a part of which is lost (altered).

In accordance with the above-described flow of the processes, the antenna controller 31 does not receive, as valid one, the ACTC signal D2 sent by the vehicle A (onboard unit A1-2) that exists in the electromagnetic wave leakage monitoring region Q2, and consequently no short-range communications are established between the antenna controller 31 and the onboard unit A1-2.

Operational Effects

As has been described thus far, the communication control device 1a according to the first embodiment includes: the erroneous communication prevention antenna 21 operable to receive electromagnetic waves sent from the electromagnetic wave leakage monitoring region Q2; the switch 320 disposed on the communication interconnection between the dedicated short-range communication antenna 20 and the antenna controller 31, and operable to cut off at least a part of the signal to be received from the dedicated short-range communication antenna 20; and the signal alteration unit control unit 322 operable to control the switch 320 in a case where the erroneous communication prevention antenna 21 receives electromagnetic waves, and make the switch 320 cut off the received signal transmitted from the dedicated short-range communication antenna 20 to the erroneous communication prevention antenna 21.

With this configuration, in a case where the onboard unit A1 with which the antenna controller 31 should have no valid communications (the onboard unit A1 that exists in the electromagnetic wave leakage monitoring region Q2) sends electromagnetic waves (specifically, the ACTC signal D2), the electromagnetic waves are received by the erroneous communication prevention antenna 21. Then, once the erroneous communication prevention antenna 21 receives the electromagnetic waves, the signal alteration unit control unit 322 controls the switch 320 and makes the switch 320 cut off the transmission of the ACTC signal D2 to the antenna controller 31.

Hence, the erroneous communications with the onboard unit A1 that does not exist in the dedicated short-range communication region Q1 can be suppressed.

Incidentally, there is a known technique that can be used as a solution to the same problem that this embodiment addresses. The technique includes: detecting the arrival angle of the electromagnetic waves that come from the onboard unit; and determining, based on the detection result of the arrival angle, whether valid short-range communications will be performed. A correct detection of the radio-wave arrival angle, however, needs not only the installation of at least one special array antenna (i.e., angle of arrival (AOA) antenna) but also a complex determination process that includes a calculation of the arrival angle.

In contrast, the erroneous communication prevention antenna 21 according to this embodiment may have a simple configuration that requires only determination of whether the erroneous communication prevention antenna 21 has received electromagnetic waves from the onboard unit A1. In addition, the erroneous communication prevention antenna 21 according to this embodiment may be a receive-only antenna. In addition, the IF box 32 (signal alteration unit control unit 322) may perform a simple determination process because the only criterion for the determination of connection/cutting-off by switch 320 is the result of determination of whether the "erroneous communication prevention antenna 21 has received electromagnetic waves."

In addition, communication control device 1a according to this embodiment further includes the monitoring-time setting unit 323 operable to set a monitoring time in accordance with the transmission timing of the signal (specifically, the FCMC signal D1) sent from the antenna controller 31. Then, in a case where the erroneous communication prevention antenna has received electromagnetic waves during the monitoring time set by the monitoring-time setting unit 323, the signal alteration unit control unit 322 cuts off the signal to be received (specifically, the ACTC signal D2).

Hence, the process of altering (cutting off) the ACTC signal D2 in response to the reception of electromagnetic waves by the erroneous communication prevention antenna 21 is limited to within the period when the ACTC signal D2 in response to the FCMC signal D1 is assumed to be received. Accordingly, the malfunction of the communication control device 1a caused by the reception of disturbing electromagnetic waves or the like by the erroneous communication prevention antenna 21 can be suppressed.

For example, the erroneous communication prevention antenna 21 is also assumed to receive disturbing electromagnetic waves that are not related to the short-range communications in the toll collection system 1. Even in a case where the erroneous communication prevention antenna 21 receives disturbing electromagnetic waves of the above-mentioned kind, the signal alteration unit control unit 322 does not perform the process of cutting off the communication interconnection as long as the timing of receiving the disturbing electromagnetic waves is outside the monitoring time (a period from the point of time ta1 to the point of time ta2 (see FIG. 4)). Hence, a malfunction of unassumedly cutting off the received signal (ACTC signal D2) due to the reception of unassumed electromagnetic waves such as disturbing electromagnetic waves can be suppressed.

Modified Example

The toll collection system 1 and the communication control device 1a according to the first embodiment have been described in detail thus far. However, specific aspects of the toll collection system 1 and of the communication control device 1a according to the first embodiment are not limited to the ones described above. Various design modifications may be made without departing from the gist.

For example, the descriptions in the first embodiment is based on an aspect where the switch 320 is disposed on the communication interconnection between the antenna controller 31 and the dedicated short-range communication antenna 20. The switch 320, however, is an aspect of "signal alteration unit" operable to alter the signal received from the dedicated short-range communication antenna 20 (i.e., ACTC signal D2). Thus, the specific aspect described above of the switch 320 is not the only possible aspect.

Accordingly, any aspect is allowable as long as the altered received signal (i.e., the ACTC signal D2) is altered to a degree sufficient to prevent the antenna controller 31 from recognizing the altered received signal as a received signal. For example, the signal alteration unit may be of an aspect where the antenna controller 31 is operable to detect CRC errors by altering the cyclic redundancy check (CRC) signal contained in the trailing side of the ACTC signal D2. In this case, the antenna controller 31 does not perform valid short-range communications in a case where the antenna controller 31 detects a CRC error at the reception of the ACTC signal D2.

In addition, the erroneous communication prevention antenna 21 may be of an aspect that includes an electromagnetic wave detection circuit including a combination of a known amplifier circuit, a wave detection circuit, and the like. In this case, the received-signal monitoring unit 321 is of an aspect where the received-signal monitoring unit 321 receives signals from the dedicated short-range communication antenna 20 via the electromagnetic wave detection circuit.

Second Embodiment

Next, a toll collection system and a communication control device according to a second embodiment will be described below with reference to FIG. 7.

Figure 7:
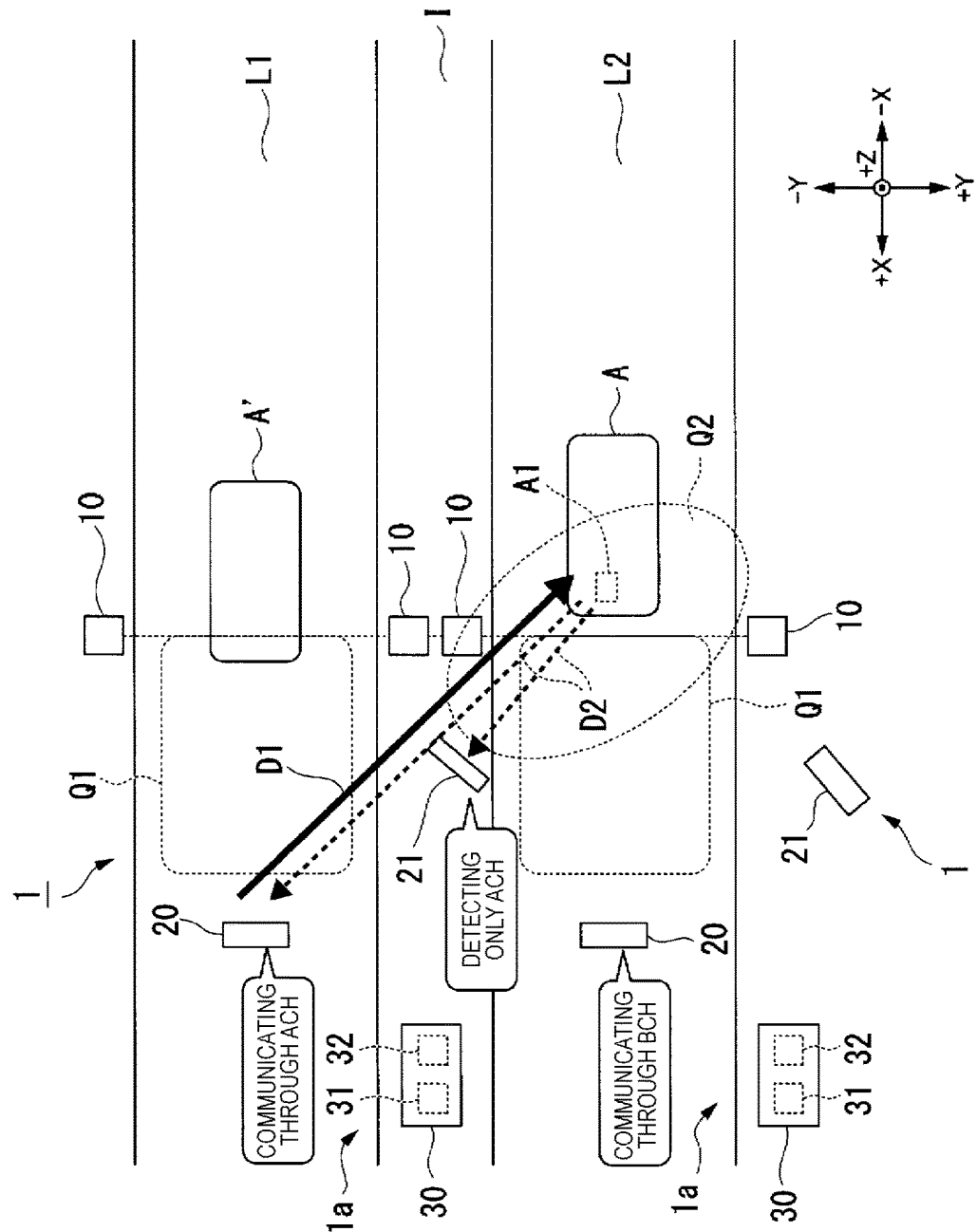
FIG. 7 is a diagram illustrating an overall configuration of a toll collection system according to a second embodiment.

FIG. 7 is a diagram illustrating an overall configuration of a toll collection system according to the second embodiment.

As illustrated in FIG. 7, toll collection systems 1 according to the second embodiment are individually disposed for a lane L1 and a lane L2. As in the case of the first embodiment, the toll collection system 1 includes a vehicle detector 10, an dedicated short-range communication antenna 20, an erroneous communication prevention antenna 21, and a lane control device 30. As in the case of the first embodiment, the lane control device 30 accommodates an antenna controller 31 and an IF box 32.

A communication control device 1a includes the erroneous communication prevention antenna 21 and the IF box 32.

As illustrated in FIG. 7, the dedicated short-range communication antenna 20 of the toll collection system 1 disposed for the lane L1 sets a dedicated short-range communication region Q1 defined on the lane L1 as the target for valid communications. In addition, the dedicated short-range communication antenna 20 of the toll collection system 1 disposed for the lane L2 sets a dedicated short-range communication region Q1 defined on the lane L2 as the target for valid communications. The antenna controller 31 of the toll collection system 1 disposed for the lane L1 performs short-range communications by use of electromagnetic waves at a predetermined A-channel frequency (hereinafter, referred to as "Ach"). On the other hand, the antenna controller 31 of the toll collection system 1 disposed for the lane L2 performs short-range communications by use of electromagnetic waves at a predetermined B-channel frequency (hereinafter, referred to as "Bch") that is different from the Ach.

Hence, crosstalk between the short-range communications in the lane L1 and the short-range communications in the adjacent lane L2 can be prevented.

In this embodiment, as illustrated in FIG. 7, the erroneous communication prevention antenna 21 of the toll collection system 1 disposed over the lane L1 includes the electromagnetic wave leakage monitoring region Q2 defined on the lane L2 as a part of an electromagnetic-wave communicable area of that erroneous communication prevention antenna 21.

On the other hand, the IF box 32 (received-signal monitoring unit 321) of the toll collection system 1 installed for the lane L1 detects only the reception of the electromagnetic waves of the Ach by the erroneous communication prevention antenna 21, but does not detect the reception of the electromagnetic waves of the Bch. Hence, only in a case where the erroneous communication prevention antenna 21 has received electromagnetic waves (i.e., the ACTC signal D2) that have the same frequency as the frequency of the electromagnetic waves sent by the dedicated short-range communication antenna 20 (i.e., the FCMC signal D1), the received-signal monitoring unit 321 according to this embodiment determines that there has been a reception of the ACTC signal D2.

Next, operations of a communication control device 1a according to the second embodiment will be described below with reference to FIG. 7.

As illustrated in FIG. 7, suppose a case, for example, where a vehicle A' (a vehicle equipped with no onboard unit A1) traveling on the lane L1 enters the vehicle detection position set for the vehicle detector 10 disposed on a roadside of the lane L1. Then, the vehicle detector 10 outputs a vehicle detection signal to the antenna controller 31 for the lane L1. The antenna controller 31 for the lane L1 sends electromagnetic waves of the Ach (i.e., FCMC signal D1) through the dedicated short-range communication antenna 20 at the timing when the vehicle A' is detected. As the vehicle A' that exists on the lane L1 is equipped with no onboard unit A1, no ACTC signal D2 is sent in response to the FCMC signal D1.

Here, suppose, in addition, that a different vehicle A equipped with an onboard unit A1 is traveling on the lane L2 at the timing when the dedicated short-range communication antenna 20 for the lane L1 sends the FCMC signal D1 (Ach). As illustrated in FIG. 7, the vehicle A traveling on the lane L2 has not passed by the vehicle detector 10 for the lane L2 yet at the timing when the dedicated short-range communication antenna 20 for the lane L1 sends the FCMC signal D1 (Ach). Hence, the onboard unit A1 of the vehicle A traveling on the lane L2 has not started short-range communications (i.e., communications by means of Bch) with the antenna controller 31 for the lane L2, yet. Then, the onboard unit A1 of the vehicle A traveling on the lane L2 receives the FCMC signal D1 (Ach) sent from the dedicated short-range communication antenna 20 for the neighboring lane L1, and sends the ACTC signal D2 (Ach) in response to the reception of the FCMC signal D1 (Ach). Then, the dedicated short-range communication antenna 20 for the lane L1 receives the ACTC signal D2 (Ach) sent from the vehicle A (i.e., the onboard unit A1) traveling on the lane L2. Hence, erroneous communications may occur in the toll collection system 1 for the lane L1.

In the communication control device 1a according to this embodiment, however, the erroneous communication prevention antenna 21 for the lane L1 is assumed to be capable of receiving electromagnetic waves from the electromagnetic wave leakage monitoring region Q2 defined on the lane L2. Hence, the erroneous communication prevention antenna 21 receives the ACTC signal D2 (Ach) sent from the onboard unit A1 that exists on the lane L2 (i.e., in the electromagnetic wave leakage monitoring region Q2).

Hence, based on the received-signal cutting-off function of the IF box 32 according to the second embodiment, the ACTC signal D2 (Ach) sent by the onboard unit A1 of the vehicle A traveling on the lane L2 does not reach the antenna controller 31. Note that the received-signal cutting-off function of the IF box 32 (the switch 320, the received-signal monitoring unit 321, the signal alteration unit control unit 322, and the monitoring-time setting unit 323) according to the second embodiment is the same as that in the first embodiment (see FIG. 5 and FIG. 6). No more detailed description of the function will be given here.

As described thus far, according to the communication control device 1a of the second embodiment, erroneous communications with a vehicle traveling on the adjacent lane can be suppressed.

In addition, it is assumed that only in a case where the electromagnetic waves received by the erroneous communication prevention antenna 21 (i.e., ACTC signal D2) is electromagnetic waves of the Ach, the received-signal monitoring unit 321 of the toll collection system 1 for the lane L1 detects the reception of electromagnetic waves. Hence, even in a case where the electromagnetic waves of the valid short-range communications between the antenna controller 31 for the lane L2 and the vehicle A traveling on the lane L2 (i.e., short-range communications by means of the electromagnetic waves of the Bch) are received by the erroneous communication prevention antenna 21 for the lane L1, the short-range communications in the toll collection system 1 for the lane L1 will never be cut off.

Third Embodiment

Next, a toll collection system and a communication control device according to a third embodiment will be described below with reference to FIG. 8.

Figure 8:
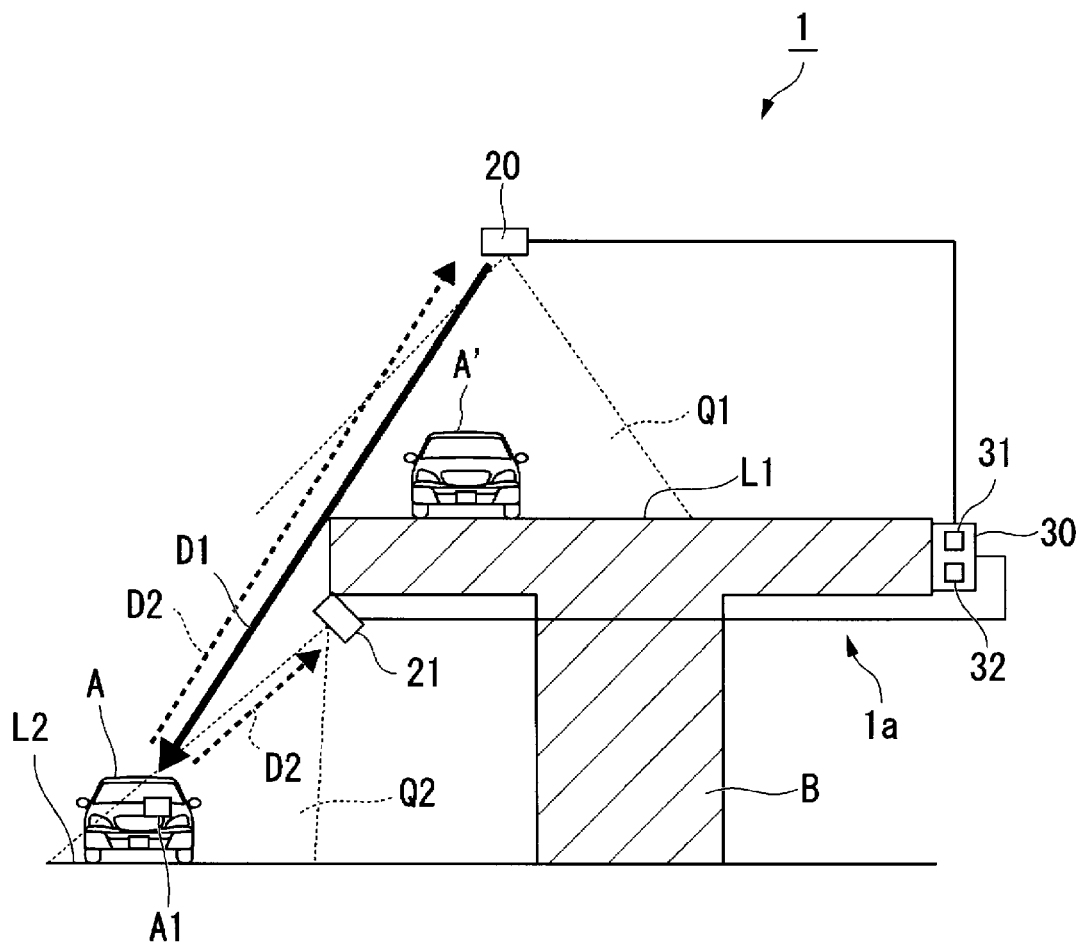
FIG. 8 is a diagram illustrating an overall configuration of a toll collection system according to a third embodiment.

FIG. 8 is a diagram illustrating an overall configuration of a toll collection system according to the third embodiment.

As illustrated in FIG. 8, a toll collection system 1 according to the third embodiment is disposed around a bridge B. As in the case of the first embodiment, the toll collection system 1 includes a vehicle detector 10, an dedicated short-range communication antenna 20, an erroneous communication prevention antenna 21, and a lane control device 30. As in the case of the first embodiment, the lane control device 30 accommodates an antenna controller 31 and an IF box 32.

A communication control device 1a includes the erroneous communication prevention antenna 21 and the IF box 32.

The toll collection system 1 according to this embodiment collects the toll only from vehicles A traveling on a lane L1 on top of the bridge B (i.e., traveling on an elevated road) but does not collect the toll from vehicles A traveling on a lane L2 under the bridge B (i.e., traveling on a road under the elevated road).

As illustrated in FIG. 8, the dedicated short-range communication antenna 20 according to this embodiment is capable of receiving electromagnetic waves sent from a dedicated short-range communication region Q1 defined on the lane L1 on top of the bridge B. In addition, the erroneous communication prevention antenna 21 according to this embodiment is capable of receiving electromagnetic waves sent from the electromagnetic wave leakage monitoring region Q2 defined on the lane L2 under the bridge B.

Next, operations of a communication control device 1a according to the third embodiment will be described below with reference to FIG. 8.

As in the case of the second embodiment, suppose a case, for example, where a vehicle A' (a vehicle equipped with no onboard unit A1) traveling on the lane L1 enters the vehicle detection position set for the vehicle detector 10 (not illustrated in FIG. 8) disposed on a roadside of the lane L1. Then, the vehicle detector 10 outputs a vehicle detection signal to the antenna controller 31. The antenna controller 31 sends electromagnetic waves (i.e., FCMC signal D1) through the dedicated short-range communication antenna 20 at the timing when the vehicle A' is detected. As the vehicle A' that exists on the lane L1 is equipped with no onboard unit A1, no ACTC signal D2 is sent in response to the FCMC signal D1.

Here, suppose, in addition, that a different vehicle A equipped with an onboard unit A1 is traveling on the lane L2 under the elevated road at the timing when the dedicated short-range communication antenna 20 sends the FCMC signal D1. As illustrated in FIG. 8, the vehicle A traveling on the lane L2 exists under the elevated road, but is in a position where the vehicle A can receive the FCMC signal D1 from above the elevated road. Hence, the onboard unit A1 of the vehicle A traveling on the lane L2 under the elevated road receives the FCMC signal D1 sent from the dedicated short-range communication antenna 20 above the elevated road, and sends ACTC signal D2 in response to the reception of the FCMC signal D1. Then, the dedicated short-range communication antenna 20 receives the ACTC signal D2 sent from the vehicle A (i.e., the onboard unit A1) traveling on the lane L2. Hence, erroneous communications may occur in the toll collection system 1.

In the communication control device 1a according to this embodiment, however, the erroneous communication prevention antenna 21 is assumed to be capable of receiving electromagnetic waves from the electromagnetic wave leakage monitoring region Q2 defined on the lane L2 under the elevated road. Hence, the erroneous communication prevention antenna 21 receives the ACTC signal D2 sent from the onboard unit A1 that exists on the lane L2 under the elevated road (i.e., in the electromagnetic wave leakage monitoring region Q2).

Hence, as at least a part of the ACTC signal D2 sent by the onboard unit A1 of the vehicle A traveling on the lane L2 and received by the dedicated short-range communication antenna 20 is cut off by the IF box 32 according to the third embodiment, the ACTC signal D2 cannot reach the antenna controller 31. Note that the processes of cutting-off the ACTC signal D2 by the IF box 32 (the switch 320, the received-signal monitoring unit 321, the signal alteration unit control unit 322, and the monitoring-time setting unit 323) according to the third embodiment are the same as the corresponding processes in the first embodiment (see FIG. 5 and FIG. 6). No more detailed description of the processes will be given here.

As described thus far, according to the communication control device 1a of the third embodiment, erroneous communications with a vehicle traveling on the lane under the elevated road can be suppressed.

Note that, in the embodiments described above, a program for achieving various functions of the IF box 32 (i.e., CPU 32a) is recorded in a computer readable storing medium, and a computer system is caused to read and execute the program that is recorded in the storage medium to implement various processes. Additionally, the steps of each process of the IF box 32 described above are stored in a computer readable recording medium in the form of a program, and these various processes are implemented by the computer reading out and executing this program. Examples of the computer-readable recording medium include magnetic disks, magneto-optical disks, CD-ROMs, DVD-ROMs, and semiconductor memories. This computer program may be distributed to the computer on a communication line, and the computer that receives this distribution may execute the program.

The IF box 32 is not limited to the aspect in which the various functional elements are encased in a single device casing. The various functional elements of the IF box 32 may be distributed in a plurality of network-connected devices.

In the foregoing, certain embodiments of the present invention have been described, but these embodiments are merely illustrative and are not intended to limit the scope of the invention. These embodiments may be implemented in various other forms, and various omissions, substitutions, and alterations may be made without departing from the gist of the invention. These embodiments and modifications are included in the scope and gist of the invention and are also included in the scope of the invention described in the claims and equivalents thereof.

INDUSTRIAL APPLICABILITY

According to the communication control device, the toll collection system, the communication control method, and the communication control program, erroneous communications can be suppressed by use of a simple configuration.

REFERENCE SIGNS LIST

1 Toll collection system
1a Communication control device
10 Vehicle detector
20 Dedicated short-range communication antenna
21 Erroneous communication prevention antenna
30 Lane control device
31 Antenna controller (main control device)
32 IF box
320 Switch (signal alteration unit)
321 Received-signal monitoring unit
322 Signal alteration unit control unit
323 Monitoring-time setting unit
A Vehicle
A1 Onboard unit
Q1 Dedicated short-range communication region
Q2 Radio wave leakage monitoring region
L Lane
I Island
CA Roof
B Bridge

The invention claimed is:

1. A communication control device comprising:
an erroneous communication prevention antenna operable to receive electromagnetic waves sent from an electromagnetic wave leakage monitoring region defined in a region that is different from a dedicated short-range communication region where valid communications are performed with a dedicated short-range communication antenna;
a signal alteration unit disposed on a communication interconnection between the dedicated short-range communication antenna and a main control device and operable to alter a received signal that is received from the dedicated short-range communication antenna;
a signal alteration unit control unit operable to control the signal alteration unit in a case where the erroneous communication prevention antenna receives electromagnetic waves to make the signal alteration unit alter the received signal transmitted from the dedicated short-range communication antenna to the main control device; and
a monitoring-time setting unit configured to set a monitoring time in accordance with a signal-sending timing at which the main control device sends a signal,
wherein in a case where the erroneous communication prevention antenna receives electromagnetic waves during the monitoring time, the signal alteration unit control unit alters the received signal.

2. The communication control device according to claim 1,
wherein the signal alteration unit is a switch operable to select connection/cut off of the communication interconnection.

3. The communication control device according to claim 1,
wherein in a case where the erroneous communication prevention antenna receives electromagnetic waves having the same frequency as the frequency of the electromagnetic waves sent by the dedicated short-range communication antenna, the signal alteration unit control unit alters the received signal.

4. The communication control device according to claim 1,
wherein the dedicated short-range communication antenna is capable of receiving electromagnetic waves sent from the dedicated short-range communication region defined on a lane on top of an elevated road, and
the erroneous communication prevention antenna is capable of receiving electromagnetic waves sent from the electromagnetic wave leakage monitoring region defined on a lane under the elevated road.

5. A toll collection system comprising:
the communication control device according to claim 1;
the dedicated short-range communication antenna; and
an antenna controller provided as the main control device and operable to perform toll-collection communications via the dedicated short-range communication antenna.

6. A communication control method using: an erroneous communication prevention antenna operable to receive electromagnetic waves sent from an electromagnetic wave leakage monitoring region defined in a region that is different from a dedicated short-range communication region where valid communications are performed with a dedicated short-range communication antenna; and a signal alteration unit disposed on a communication interconnection between the dedicated short-range communication antenna and a main control device and operable to alter a received signal that is received from the dedicated short-range communication antenna, the method comprising the step of:
controlling the signal alteration unit in a case where the erroneous communication prevention antenna receives electromagnetic waves, making the signal alteration unit alter the received signal transmitted from the dedicated short-range communication antenna to the main control device, and
setting a monitoring time in accordance with a signal-sending timing at which the main control device sends a signal,
wherein, in the controlling step, making the signal alteration unit control unit alter the received signal, in a case where the erroneous communication prevention antenna receives electromagnetic waves during the monitoring time.

7. A non-transitory computer-readable medium that stores a program applied to a computer of a communication control device including: an erroneous communication prevention antenna operable to receive electromagnetic waves sent from an electromagnetic wave leakage monitoring region defined in a region that is different from a dedicated short-range communication region where valid communications are performed with a dedicated short-range communication antenna; and a signal alteration unit disposed on a communication interconnection between the dedicated short-range communication antenna and a main control device and operable to alter a received signal that is received from the dedicated short-range communication antenna, the program comprising:
making the computer function as
a signal alteration unit control unit operable to control the signal alteration unit in a case where the erroneous communication prevention antenna receives electromagnetic waves to make the signal alteration unit alter the received signal transmitted from the dedicated short-range communication antenna to the main control device, and a monitoring-time setting unit configured to set a monitoring time in accordance with a signal-sending timing at which the main control device sends a signal, wherein in a case where the erroneous communication prevention antenna receives electromagnetic waves during the monitoring time, the signal alteration unit control unit alters the received signal.

* * * * *